United States Patent [19]

Deconinck et al.

[11] Patent Number: 4,815,044
[45] Date of Patent: Mar. 21, 1989

[54] SEISMIC SIGNAL TRANSMISSION SYSTEM USING RELAY RADIOS

[75] Inventors: Bernard Deconinck, Le Pecq; André Oliveres, Boulogne; Joseph Rialan, Meudon; Gérard Thierry, Paris, all of France

[73] Assignee: Institut Francais du Petrole, Rueil-Malmason, France

[21] Appl. No.: 57,518

[22] Filed: Jun. 1, 1987

[30] Foreign Application Priority Data

May 30, 1986 [FR] France ............... 86 07930

[51] Int. Cl.$^4$ ............................................. G01V 1/22
[52] U.S. Cl. ........................................ 367/77; 455/7
[58] Field of Search ................ 367/766, 77, 80; 455/17, 7, 21, 12; 340/870.12

[56] References Cited

U.S. PATENT DOCUMENTS

| | | | |
|---|---|---|---|
| 2,864,943 | 12/1958 | Schultz | 342/50 |
| 3,678,387 | 7/1972 | Wilson | 455/20 |
| 3,987,406 | 10/1976 | Broding | 367/80 |
| 4,086,504 | 4/1978 | Ezell et al. | 367/77 |
| 4,230,989 | 10/1980 | Buehrle | 375/4 |
| 4,553,262 | 11/1985 | Coe | 455/17 |
| 4,578,815 | 3/1986 | Persinotti | 455/17 |

FOREIGN PATENT DOCUMENTS 1192298  8/1985  Canada ......................... 367/77

OTHER PUBLICATIONS

"Using Radio Links and Relays," Dodvill et al.

Primary Examiner—Nelson Moskowitz
Assistant Examiner—Ian J. Lobo
Attorney, Agent, or Firm—Antonelli, Terry Wands

[57] ABSTRACT

A system is provided for radio transmission between a central control and recording laboratory and spaced apart acquisition boxes in which relay transmission units are used for communicating with boxes which are directly inaccessible. It includes a centralization unit adapted for managing the exchanges of orders or data from the central laboratory with directly accessible boxes by means of a radio link in a first frequency band (f2), on the one hand and with the relay units by means of a radio link in another frequency band (f1). These latter manage the radio links with the inaccessible boxes by means of radio links at a frequency (f3) distinct from (f2). The relay units and the centralization unit are programmed for automatically managing the links between the central laboratory and any one of the boxes, whether they are direct or indirect, and, on the other hand, for reserving a part of the interrogation time of each box for the transmission of service data indicative of their correct operation.

11 Claims, 4 Drawing Sheets

SEISMIC SIGNAL TRANSMISSION SYSTEM USING RELAY RADIOS

BACKGROUND OF THE INVENTION

1. Field of the Invention

The invention relates to a system for transmitting signals over a short wave link between a central control and recording laboratory and seismic data acquisition apparatus, using one or more radio relays.

The transmission system of the invention relates more particularly to the transmission of signals between a central control system and seismic data acquisition apparatus adapted for transmitting, both by radio and by transmission cable, the seismic signals they have collected, digitized and recorded. These signals are supplied thereto by seismic sensor assemblies spaced apart along a seismic profile to be studied, in response to the echoes from the reflecting layers of the subsoil of seismic signals generated in the ground by an appropriate shock producing source.

2. Description of the Prior Art

Devices for transmitting orders or data by cable or by short wave link are described in French published patent applications Nos. 2.511.772 and 2.538.561. They are associated, on the one hand, with a plurality of acquisition apparatus each adapted for communicating with a central control and recording system by radio or by cable, which are disposed in boxes or buoys deposited on the ground at a certain distance from each other and connected to the seismic receivers.

The acquisition apparatus having collected the data delivered by the seismic sensors which are associated respectively therewith, the central control and recording system sends transmission orders successively to all the acquisition apparatus so that they transmit the collected signals. The data transmissions are carried out preferably by short wave link when the quality of the transmissions is sufficient. But when the ground where the boxes or buoys are positioned is very uneven or when obstacles (thick forest for example) prevent the correct transmission of hertzian waves from certain boxes or certain groups of particular boxes, they must be connected by a transmission cable to the control and recording system, the others being connected to the central system by ratio.

Cable connections are very reliable whatever the nature or relief of the ground but positioning thereof requires time consuming and expensive setting up and removal operations, especially in mountains or marshy regions.

The selective connection of the boxes or buoys to the common transmission cable substantially simplifies the installation face in the field of the seismic reception assembly. But this combined system sometimes has certain drawbacks in the case where, for example, the number of cases for which the satisfactory short wave links are impossible is relatively small or where it is however necessary to unwind a transmission cable, sometimes over very large distances, for connection them to the central system, while passing through zones where the short wave links are satisfactory. This case occurs for example when a part of the boxes or buoys is disposed on the same slope of a rise in the ground as the central control and recording system, and is accessible by short wave link and when another part of them is installed on the opposite slope and only accessible by means of a transmission cable. Such a cable must consequently be positioned so as to cross over the rise in the ground and allow the connection of these distance boxes to the central system.

In some cases also most of the boxes or buoys are disposed in a zone in which the radio transmissions are satisfactory but, on the other hand, accessible only with difficulty from the central control and recording system when this latter is outside said zone, which also means that a transmission cable of great length must be unwound between these boxes and the central system.

The transmission system of the invention overcomes the above mentioned drawbacks.

SUMMARY OF THE INVENTION

It includes radio transmission and reception means associated respectively with the different acquisition boxes, a unit for centralizing the communications associated with the central laboratory, including a first radio transmission and reception assembly adapted for operating at a first frequency and a second ratio transmission and reception assembly adapted for operating at a second frequency, different from the first one, and at least one relay unit.

It is characterized in that each relay unit includes a first radio transmission and reception assembly adapted for operating at said first frequency for providing the exchanges between said relay unit and the first radio transmission and reception assembly of the centralization unit, and a second ratio transmission and reception assembly adapted for operating at a third frequency specific to each relay unit, so as to provide communication with at least a first group of acquisition boxes, the centralization unit includes a control assembly with a programmable processing means for managing the transfers at the first frequency between the centralization unit and each relay unit as well as the transfers between the centralization unit and at least one of the second group of acquisition boxes using the second frequency, and each relay unit includes a control assembly with a programmable processing means for managing its own transfers at said third frequency with the first associated group of acquisition boxes.

The use of relay units capable of managing communications by ratio with acquisition boxes which are inaccessible or accessible only with difficulty from the position of the central laboratory, and a centralization unit capable of managing the communications between the central laboratory, the directly accessible acquisition boxes and the relay units, at distinct frequencies so as to avoid undesirable radio interactions, makes the communication system entirely transparent. The central laboratory, having to exchange controls or data with any of the acquisition boxes, delegates to the centralization unit the task of establishing the communication using the radio channel which is the most suitable for this box in accordance with a pre-established procedure. The control of the acquisition boxes from the central laboratory is thus greatly facilitated.

In one embodiment, the communication frequency between each relay unit and the association group of acquisition boxes is specific for each relay unit, the radio transmission and reception assemblies associated with the acquisition boxes, with the centralization unit and with each relay unit having a frequency synthesis generator and switchable means for selecting the transmission-reception frequency of each of them from a plurality of specific frequencies.

Since the selection and change of the radio carrier frequencies may be made rapidly, adaptation thereof to the regulations in force concerning telecommunications is facilitated.

Each relay unit may include test signal measurement means and means for translating the modulation signals of the first frequency (that of the carrier providing exchanges between the centralization unit and the relay units), the control assemblies of the centralization unit and of each relay unit being adapted for controlling the transmission of the test signals in time intervals between the data and control signal transmissions. This arrangement is advantageous to the extent that it allows the remote monitoring of the correct operation of the relay units and of the radio equipment assigned to communications between each relay unit and the group of acquisition boxes under its dependence.

BRIEF DESCRIPTION OF THE DRAWINGS

Other features and advantages of the system of the invention will be clear from reading the description of one embodiment given by way of non limitative example, with reference to the accompanying Figures in which.

DESCRIPTION OF THE PREFERRED EMBODIMENT

The system of the invention is adapted for establishing communications between a control and recording laboratory and an assembly of seismic data acquisition apparatus or boxes spaced apart over the ground where the seismic operations are taking place. Each apparatus is adapted for collecting seismic signals picked up by one or more seismic receivers coupled with the ground, these signals corresponding to echoes from underground reflectors of pulses imparted to the ground by a seismic source of any type, for digitizing the signals picked up and recording them. At the end of each transmission-reception cycle, the acquisition apparatus, controlled accordingly by the laboratory, transmit thereto the data which they have stored.

The acquisition apparatus described in French Pat. No. 2,511,772 are advantageously used. These apparatus may be connected to a central control and recording laboratory either by a common transmission cable or by a short wave link. In the absence of a cable, each apparatus communicates by radio with the central laboratory. If the transmission cable is connected thereto, their own radio means are switched off and the connections with the laboratory take place over the transmission cable.

The acquisition apparatus are disposed preferably in sealed boxes associated possibly with buoys, when operating in water covered or very damp zones (lakes, marshes, forests etc).

Figure 1:
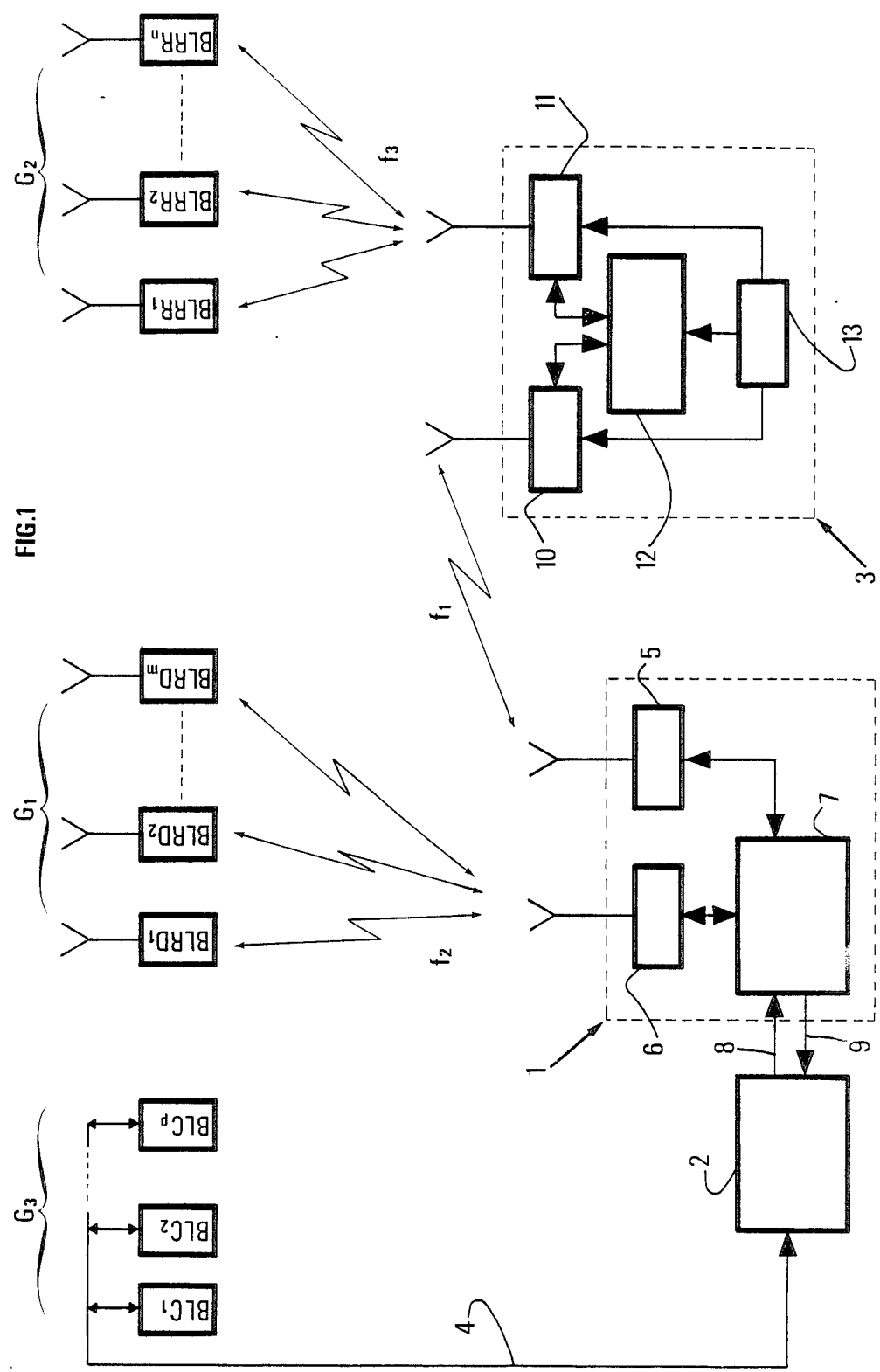
FIG. 1 shows the block diagram of the transmission system as a whole.

Referring to FIG. 1 it can be seen that the transmission system includes a unit 1 for centralizing the short wave link exchanges (CRU) between a control and recording laboratory 2 and the acquisition boxes spaced apart over the ground. The assembly of the acquistion boxes includes a first subassembly G1 of box BLRD1, BLRD2 ... BLRDm with direct radio link, that is to say capable, because of their situation in a zone favorable to the correct propagation of hertzian waves, of communicating directly with the centralization unit 1. The assembly of boxes also includes a second subsassembly G2 of boxes BLRR1, BLRR2 ... BLRRn, with relayed radio link, that is to say boxes inaccessible directly by shortwave link because of their situation on the ground, because of the relief of this latter or its vegetation. The link with the boxes of subassembly G2 is provided by at least one relay transmission unit 3 (RRU) adapted for relaying the exchanges by short wave link between the centralization unit 1 and a part at least of the boxes of group G2. The relay transmission unit 3 or each of them is disposed on the ground in a chosen position where the radiocommunications with the centralization unit 1 and with each of the boxes of the group of associated boxes are easy to establish.

The assembly of boxes may also optionally include a subassembly G3 of boxes BBC1, BLC2 ... BLCp which, because of their special structure (described in the above mentioned patent application), are connected to the central laboratory 2 by a common transmission cable 4.

The centralization unit 1 (CRU) includes a first transmitter-receiver of hertzian waves 5 at frequency f1 for establishing radio links with the relay transmission unit 3, a second transmitter-receiver of hertzian wave 6 at frequency f2, different from f1, for the radio links with the accessible boxes of group G1, and a control assembly 7 connected on the one hand to the two transmitters-receivers 5, 6 and on the other to the laboratory 2. Connection with this latter is provided by a transmission cable including control signal transmission lines 8 and data signal transmission lines 9.

Each relay transmission unit 3 includes a first transmitter-receiver of hertzian waves 10 at frequency f1, providing communication with the first transmitter-receiver 5 of the centralization unit 1, and a second transmitter-receiver at frequency f3 for providing the radio links with the different boxes of group G2 which are under its control, and a control assembly 12 for selectively providing the exchanges between the two emitters-receivers, 10, 11 and an electric power source 13.

The acquisition boxes each include a transmitter-receiver centered on the frequency f2 and f3, depending on the transmission frequency of the element with which it communicates, whether it is a question of the centralization unit 1 or a relay transmission unit 3, as will be seen in greater detail further on in the description. By way of example, frequency f1 may be chosen in the 220 MHz band, frequencies f2 and f3 in the 70 to 76 MHz band, depending on the official telecommunications requlations of the place where the seismic transmission system is used. If several relay transmission units are used, each of them communicates with the subassembly of boxes which it controls at a specific frequency.

The adjustment of the communication frequencies is facilitated by the use of frequency synthesizer transmitters either in the centralization unit 1, or in the relay transmission unit 3 or in the acquisition boxes. Such a transmitter (FIG. 1) a VCO type oscillator 14 whose oscillation frequency is determined by the application of a control voltage coming from a low pass filter 15. The input of filter 15 is connected to the output of a frequency synthesizer circuit 16 of known type including phase locked loops and a predivider for applying to the reference frequency emitted by a quartz 17, a programmable reduction factor. The selection of this reduction factor is provided by selectively operating the switches of a switch assembly 18. The signal applied to the input of the synthesizer circuit is the output signal from the oscillator (VCO) 14. The signal to be transmitted is amplified by an amplification stage 19 and is applied to the "modulation" input of oscillator 14. The modulated carrier available at the output of oscillator 14 is applied to an amplification chain including a preamplifier 20, a power amplifier 21 and a low pass filter 22, the amplified signal being applied to a transmission-reception antenna Y through an antenna duplexer of known type 23 allowing the alternate operation of the transmitter and the associated receiver 24.

The signal applied to the input of the amplification stage 19 is delivered by a coding element COD applying for example the NRZ code to the digitized signals to be transmitted.

The control assembly 7 of the centralization unit 1 (CRU) includes (FIG. 3) an 8 bit microprocessor 25 of NSC800 type for example, communicating over address and data buses 26 with ROMs 27 of the REPROM type, random access memories RAM 28, display unit 29 connected to the buses 26 through a controller 30 a matching circuit 31 of the UART type for matching the signals before transmission thereof or conversely the signals received before transfer to bus 26, a keyboard 32 allowing an operator to give instructions, the keyboard being connected to a keyboard coder 33, an interface card 34 having two parallel input-output ports A, B, an FSK (frequency shift keying) message detector 35 and two multiplexers 36, 37. It also includes an element 38 for filtering and shaping the data DATA signals representing the data received by the transmission-reception assemblies 5, 6 and modulating the carrier at frequency f1 or the carrier at frequency f2, and an assembly of counters 39 generating a sequence of staggered pulses which will be subsequently defined in the part of the description relative to the operation of the system.

The different signals present at the inputs and outputs of the interface card, the multiplexers 36, 37 and detector 35, and their functions are as follows.

Figure 2:
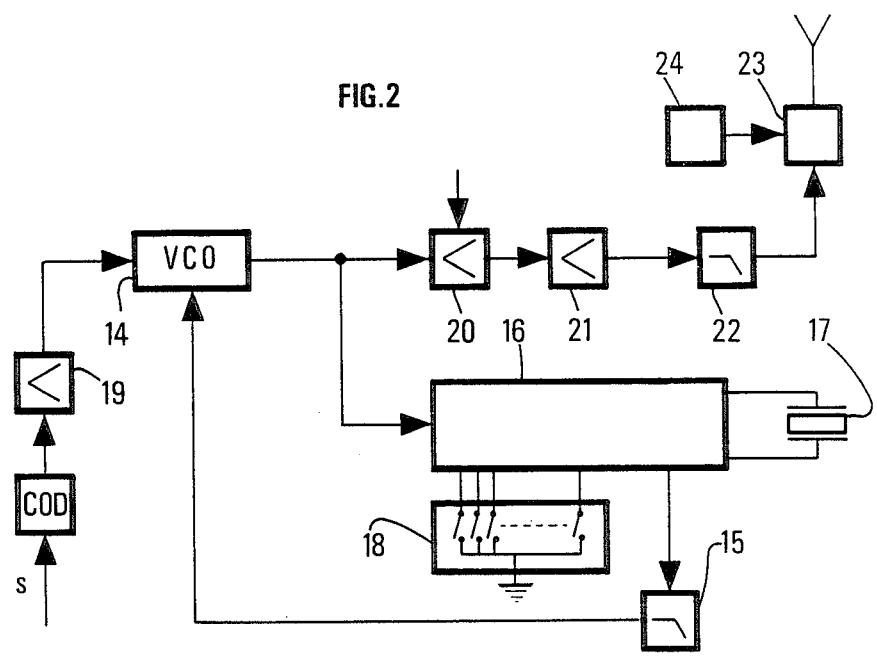
FIG. 2 shows a frequency synthesis carrier wave generator.

CDE EM f1: is generated by the control assembly 7. At the low logic level, it controls the transmission by the transmitter-receiver 5 (FIG. 1) of the carrier at frequency f1;

STEM f1: is a signal from the synchro-primary of the transmitter-receiver 5 and synchronous with the signal HBIT f1 which H BIT f1: is a clock signal regenerated by the synchro-primary of the transmitter-receiver 5;

SYNC f1: is a signal indicating, at the low logic state, the locking of the synchro-primary;

FSKL f1: is a logic signal for driving the FSK modulator of the transmitter-receiver 5;

CDE EM f2: is a signal controlling the transmission of a carrier wave of frequency f2 by the transmitter-receiver 6, when it is at the low logic level;

ST EM f2: indicates, at the low logic level, that the transmitter-receiver 6 is indeed transmitting a carrier wave of frequency f2;

NRZ f2: is delivered by the synchro-primary of the transmitter-receiver 6 and is synchronous with the signal H B/T f2, which H B/T f2: indicates at the low logic state the locking of the synchro-primary;

FSKL f2: is a signal driving the FSK modulator of the transmitter-receiver at frequency f2;

CDE EMT: is a control signal sent out by the control laboratory 2 (FIG. 2) for triggering the transmission of a carrier wave by the transmitters-receivers 5 and 6;

ST EMET: informs the laboratory 2 of the state of the transmitter-receiver 6;

NRZ: is a signal from the synchro-primary of the transmitter-receivers 5 or 6 depending on the position of the multiplexer 37;

H B/T: is a clock signal regenerated by the synchro-primary of the transmitters-receivers 5 and 6, depending on the position of the multiplexer 37;

SYNC: at the low logic level, this signal indicates that the synchro-primary of the transmitter-receiver 5 or 6 is locked;

FSKL: is a logic signal driving the FSK modulator of the transmitters-receivers 5 or 6;

N/REP: controls the multiplexer 37. When it is at the high logic level, the central laboratory receives data from the transmitter-receiver 5 at frequency f1 (case in which the relay transmission element comes into play for transmitting the data from the group G2 of cases (FIG. 1). If it is at logic level 0, the data received by the central laboratory is coming from non relayed boxes (group G1);

CDREP: controls the multiplexer 36. When it takes on the high logic level, the output of the circuit 31 (UART) is connected to the output FSKL f1 for the transmission of orders to the relay transmission unit 3 (RRU) or each of them, if there are several. When it assumes the low logic level, the signal FSKL is transmitted from the output assigned to FSKL f1, and the orders sent out by the central laboratory transit to the transmitter-receiver 5 and the relay transmission unit;

BUSY: indicates the state of the FSK message detector 35. It must be at the low logic level for switching the multiplexer 36.

The interface card 34 includes a clock producing interruption signals IT for the microprocessor 25, whether it is at a constant recurrence period or whether it is a question of signals marking the times Tdb, Tdhf or Trhf during the interrogation of a relay transmission unit. (These times will be defined further on in the description of the operating mode of the system).

The FSK message detector circuit 35 watches for the appearance of the signal FKSL. It operates as a retriggerable monostable flip-flop. If the signal FRSKL takes on the logic value 1 for at least a given time interval $\Delta t$, the BUSY signal takes on the logic value 0 and the microprocessor may control the multiplexer 36.

Figure 4:
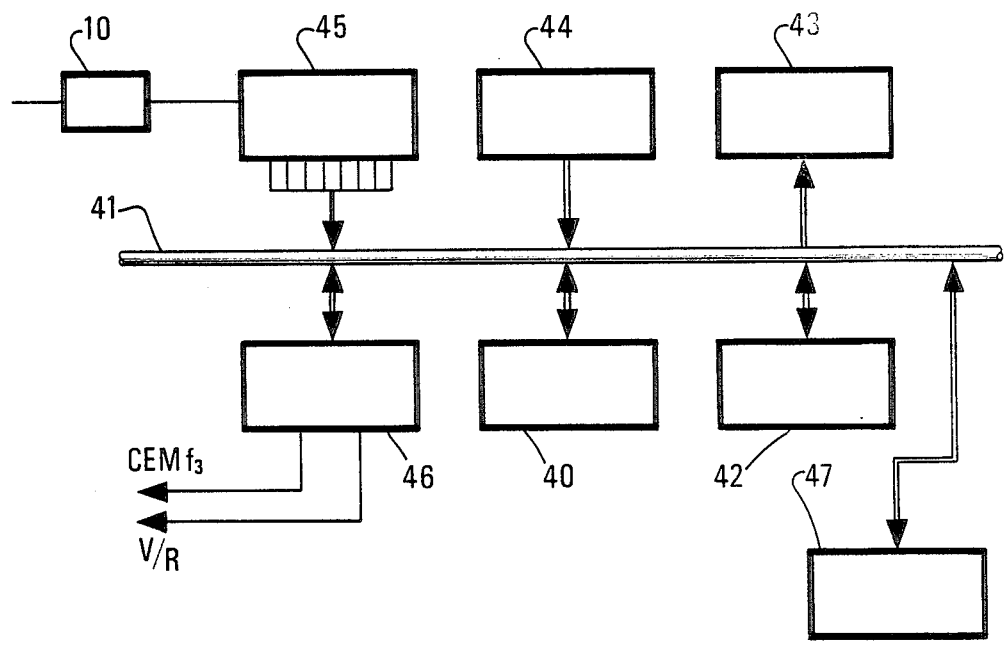
FIG. 4 shows the block diagram of the control assembly contained in each relay unit.

The control assembly 12 (FIG. 1) for coordinating the exchanges between the two transmitters-receivers 10, 11 of each relay transmission unit 3 comprises (FIG. 4) an 8 bit microprocessor 40 communicating over a bus 41 with an ROM 42, a display unit 43 an address decoder 44, a signal matching element 45 of the UART type, an interface circuit 46 including programmable counters (timers) and a card 47 for measuring different operating parameters of the power supply 13 and of the transmitter-receiver 11.

The signals received from the receiver part of the transmitter-receiver 10 are applied to the reception input of the matching element (UART) 45 and this latter transforms them to 8 bit words which are transferred to bus 41.

As will be seen in greater detail in the part describing the operation, the microprocessor 40 checks, on the one hand, that the messages received do in fact concern the relay transmission unit (RRU) 3, that they are intended for an acquisitio box dependent on this relay unit and that they are confirmed. In which case, the interface circuit 46 sends an appropriate control to the transmitter-receiver using the frequency f3 (communication with the acquisition boxes of group G2).

Each relay transmission unit (RRU) 3 may be placed in a stand-by condition, corresponding to a minimum electric consumption or in a ready condition. The messages transmitted are thus preceded by an alert signal. When a relay unit is concerned, the interface circuit 46 delivers an activation signal V/R for taking messages into account if required.

The measurement card 47 includes a first voltage/current converter 48 (FIG. 5) connected to the terminals of the supply battery 13 and adapted for comparing the voltage thereof with a first reference voltage VR1 and for converting into current variations the differences between the two voltages compared. It also includes a second voltage/current converter 49 which, similarly, compares the amplitude of the carrier wave received by the transmitter-receiver using the frequency f3 (communication between the relay element and the acquisition boxes under its control) with a reference voltage VR2 and a transform the differences between the two compared voltages into current variations. The signals from the two converters 48, 49 are applied to two modulation input terminals of a current/frequency converter 50. This latter delivers a signal whose frequency depends on the current applied to one or other of themodulation input terminals, selection thereof being effected by applying a signal $SB_c$ applied to a channel selection input. The signal from converter 50 is applied to a first terminal of a two input switch 51, the second terminal receiving the DATA measurement signals which the relay transmission unit 3 (RRU) retransmits to the centralization unit 1 (CRU). The output terminals of switch 51 is connected to the modulator 52 of the transmitter-receiver 10 (FIG. 1). The selection of channels is controlled by application, to the control input of switch 51 of the signal delivered by a threshold comparator 53 which checks the presence or absence of the Vf3 carrier wave signal at the input of converter 49. As will be seen further on, with this arrangement the state of the transmitters and of the supply batteries can be retransmitted to the control laboratory and the correct operation thereof can be monitored.

OPERATION OF THE SYSTEM

The centralization unit 1 (CRU) manages the transmission of the orders received from the central control and recording laboratory 2 to all the acquisition boxes either directly by means of the transmitter-receiver 6 at frequency f2, or indirectly by means of the transmitter-receiver 5 at frequency f1, through at least one relay transmission unit 3 (RRU), and receives in return the transmission of the responses from the different elements interrogated. The centralization unit 1 (CRU) sends two types of commands.

The first is a command for waking up and/or initializing a relay unit (RRU) including a sequence of several bytes which defines the number of the relay unit 3 interrogated and the numbers of all the boxes dependent thereon.

The second is a command which, when suitably decoded, allows a relay unit to be placed in stand-by condition (reduced electric consumption). This command is made through the interface circuit 44 (cf. FIG. 4).

Figure 3:
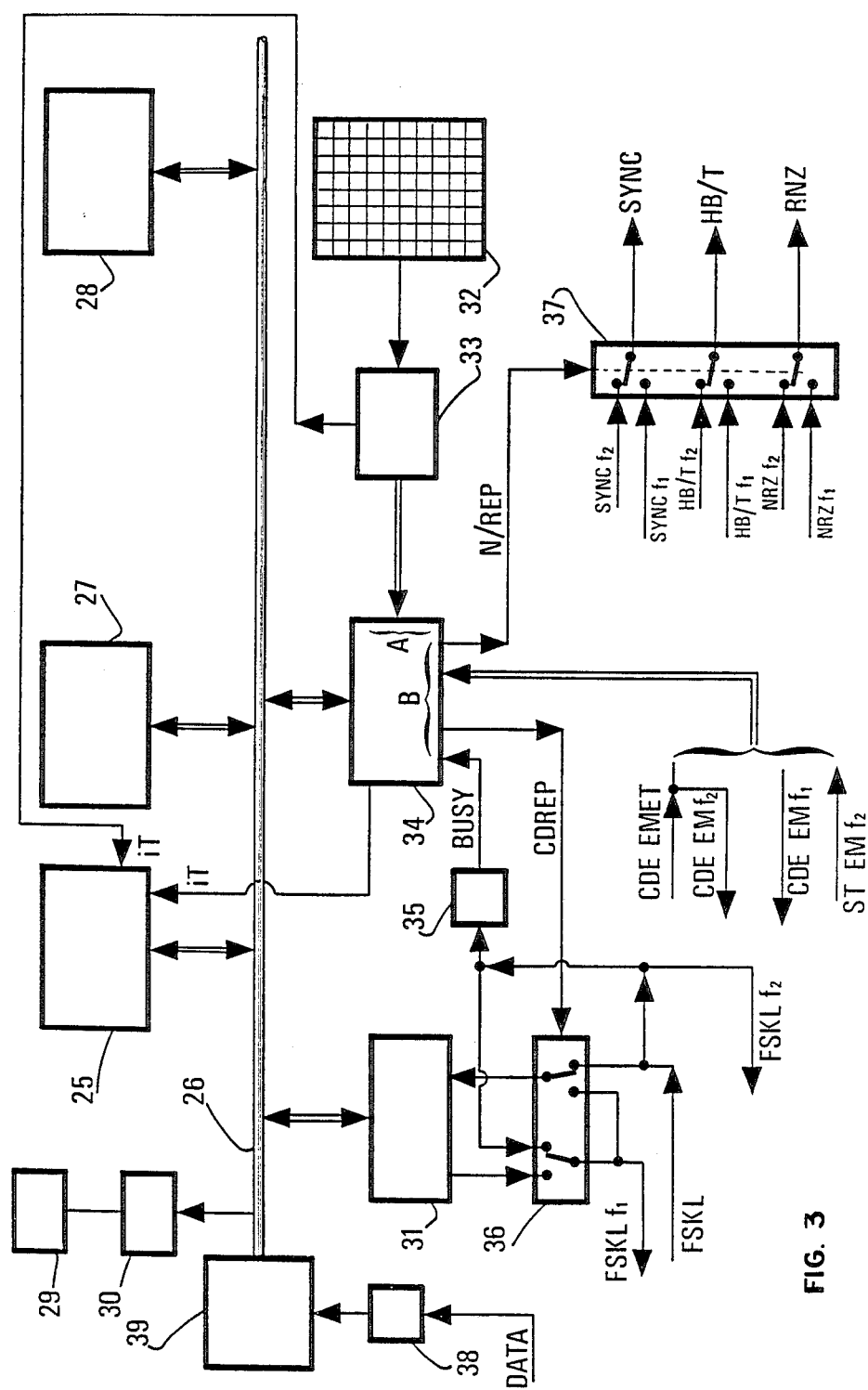
FIG. 3 shows the block diagram of control assembly contained in the centralization unit.

To avoid transmission errors and to make interpretation of the order more certain, the commands are repeated three times in succession and are only taken into account by the relay units if they are recognized at least twice. The commands are sent either directly by the central laboratory 2, or by the action of an operator on the keyboard 32 of the centralization unit 1 (CRU) (FIG. 3).

The centralization unit 1 (CRU) ensures the management of the two transmitters-receivers 5, 6 (FIG. 1). It decodes the commands sent to the acquisition boxes by the central laboratory and compares the number of the acquisition boxes interrogated with the list of box numbers assigned to the different relay units 3 (RRU) and, if the interrogated box belongs to one of these lists, it directs the commands to the transmitter-receiver at frequency f1. In return, depending on whether the box interrogated is directly or indirectly accessible, it establishes the communication between the transmitters-receivers 6 or 5 and the central laboratory.

Figure 6:
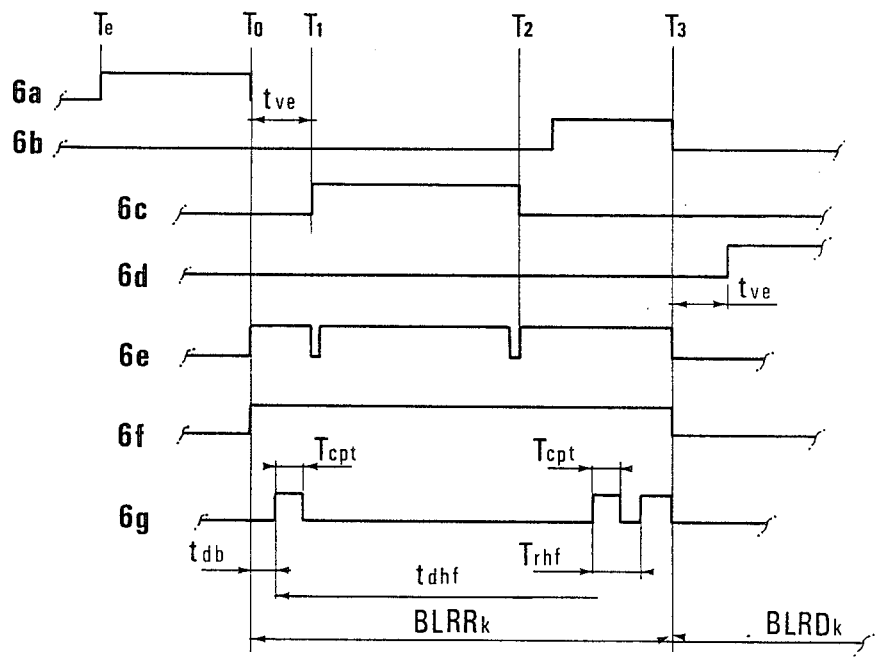
FIG. 6 shows timing diagrams of an interrogation sequence of an acquisition box relayed by a relay unit.

The timing diagrams of FIG. 6 show an operating sequence of two boxes, one BLRRk relayed by a relay unit 3.

The central laboratory generates, between successive times Te and To (timing diagram 6a), a sequence of bytes concerning for example the acquisition box BLRRk which is transmitted by the transmitters of the transmitter-reception assemblies 5, 6 under the control of the centralization unit 1 (CRU). The sequence is decoded by this unit, by the relay units 3, (RRU) and by the acquisition boxes.

The box BLRRk concerned, when it has recognized its number, begins its transmission cycle at time T1 (timing diagram 6c) offset by a time interval tve with respect to time To, and interrupts it at time T2. The relay unit 3 (RRU) controlling the box BLRRk, triggers off the transmission of a carrier wave at time To (diagram 6e).

Figure 5:
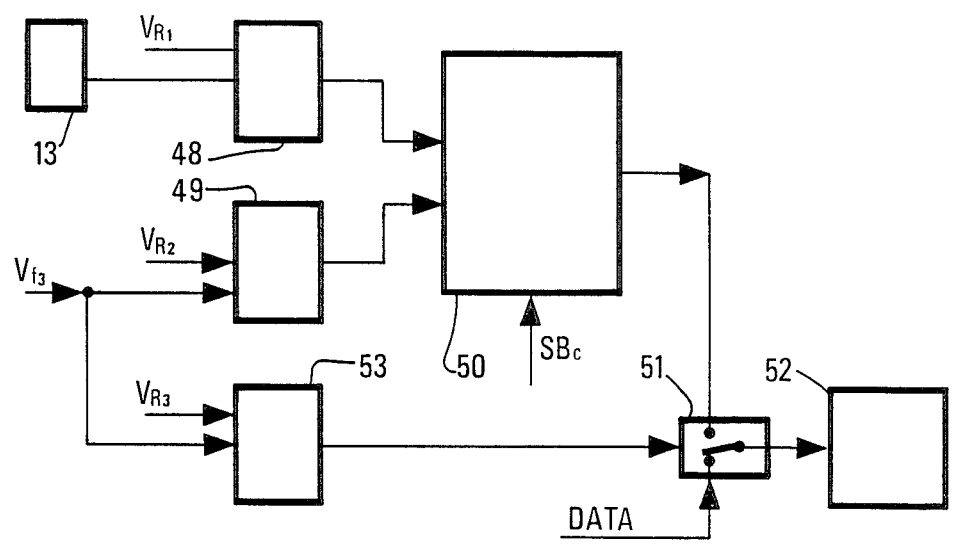
FIG. 5 shows schematically a device contained in each relay unit for generating modulation signals representing the values assumed by a supply voltage and the amplitude of a radio carrier.

Between times To and T1 the carrier wave of the transmitter of the transmission-reception assembly 10 is modulated by the signal from the converters 48 and 50 (FIG. 5).

Between the times T1 and T2, the relay transmission unit 3 (RRU), relays the responses transmitted by the transmitter of the transmission-reception assembly associated with the box concerned.

Between times T2 and T3, the same carrier wave is modulated by the signal from converters 49 and 50 and representative of the amplitude of the carrier signal picked up by the transmission-reception assembly 11 (FIG. 1).

The centralization unit 1 (CRU) taking into consideration the fact that the acquisition box concerned (BLRRk) belongs to the list of boxes controlled by one of the relay units, causes the signal N/REP to rise to the logic value 1 (diagram 6f and FIG. 3) between times To and T3. The central laboratory therefore receives the data from the box by means of the carrier wave at frequency f1. From time To, the assembly of timers 39 of the centralization unit 7 (FIG. 3) generates a sequence of three pulses.

(a) a first one, Tcpt delayed by a time tdb, triggers off the acquisition of a signal received from the relay element (RRU), representing the supply voltage thereof. It will be recalled that it is question of the modulation signal delivered by converters 48, 50 (FIG. 5).

(b) a second one, Trhf delayed by a time interval tdhf, triggers off the acquisition of the signal representing the amplitude of the carrier wave at frequency f3, delivered by converters 49 and 50 (FIG. 5). The delay tdhf is determined as a function of the number of samples to be transmitted. This number is obtained by decoding the initialization commands sent to the acquisition boxes;

(c) a third, delayed by an interval trhf with respect to the preceding one, triggers off reading of the result of the preceding acquisition.

The management of the messages received by each relay transmission unit 3 (RRU9, takes place in accordance with the following rules:

The relay transmission units receive, as has been seen, an initialization message repeated three times and take it into account if it is decoded at least twice. It indicates thereto the list of acquisition box numbers which are respectively under their control.

The general messages of interrogation of the boxes are sent by the centralization unit 1 (CRU) to the relay unit 3 (RRU) over the radiochannel at frequency f1 and, from there, are relayed by the radiochannel at frequency f3 to the different boxes.

the standby or alert messages place the relay units in a position of minimum consumption or on the contrary in a transmitting condition.

when a message does not concern a relay unit, its control assembly 12 puts it immediately in the standby position and the message is not taken into account.

on reception of messages concerning an acquisition box, the relay unit 3, after decoding, orders its transfer from one transmitter-receiver to the other for transmission.

The exchanges with the acquisition boxes of group G3 over cable 4 (FIG. 1) are managed directly by the central laboratory 1.

What is claimed is:

1. In a system for transmission of seismic signals to a central control and recording laboratory from two groups of data acquisition boxes, each box being adapted for collecting signals from at least one seismic receiver and for digitizing and storing said signals as data;

one of said groups being in direct radio communication with said central laboratory without passing through a radio relay unit and the other of said groups being located where radio communication with the central laboratory is only through a path which includes at least one radio relay unit;

said central laboratory including a communications centralizing unit comprising a first radio transmission and reception assembly for operating at a first frequency ($f_2$) for direct communication with said one group and a second radio transmission and reception assembly for operation at a second frequency ($f_1$) for direct communication with said radio relay unit;

said radio relay unit having a first radio transmission and reception assembly for operating at said second frequency ($f_1$) for direct communication with said centralizing unit and a second radio transmission and reception assembly for operating at a third frequency ($f_3$) for direct communication with the other of said groups;

said communications centralizing unit further comprising a control assembly having a programmable processing means for managing the transfer of data from each of said data acquisition boxes by controlling operation of said first and second radio transmission and reception assemblies belonging to said centralizing unit; and said radio relay unit including a control assembly with a separate programmable processing means responsive to a signal from said centralizing unit second radio transmission and reception assembly operating at said second frequency ($f_1$) for managing the transfer of data to the central laboratory from the data acquisition box of said other of said groups as selected by the processing means of the centralizing unit, said transfer of data between said selected data acquisition box and said radio relay unit being at said third frequency and the transfer of the same data between said radio relay unit and said centralizing unit being at said seconf frequency;

wherein each relay unit includes test signal measurement means and means for translating the test signals into signals for modulating said first frequency, the control assemblies of the centralization unit and of each relay unit being adapted for controlling the transmission of the test signals in time intervals between the data and control signal transmissions.

2. The system as claimed in claim 1, including means for detecting a carrier wave signal amplitude and connection means for applying said carrier wave signals and supply voltages to be controlled to converters adapted for changing said voltages under control or the amplitudes measured into variable frequency signals.

3. The system as claimed in claim 1, wherein said programmable processing means include microprocessors.

4. The system as claimed in claim 3, wherein said programmable processing means include means for storing lists of acquisition boxes and access addresses to these acquisition boxes.

5. The system as claimed in claim 3, wherein the processing means of said centralization unit include instruction display and introduction means.

6. In a system for transmission of seismic signals to a central control and recording laboratory from two groups of data acquisition boxes, each box being adapted for collecting signals from at least one seismic receiver and for digitizing and storing said signals as data;

one of said groups being in direct radio communication with said central laboratory without passing through a radio relay unit and the other of said groups being located where radio communication with the central laboratory is only through a path which includes at least one radio relay unit;

said central laboratory including a communications centralizing unit comprising a first radio transmission and reception assembly for operating at a first frequency ($f_2$) for direct communication with said one group and a second radio transmission and reception assembly for operation at a second frequency ($f_1$) for direct communication with said radio relay unit;

said radio relay unit having a first radio transmission and reception assembly for operating at said second frequency ($f_1$) for direct communication with said centralizing unit and a second radio transmission and reception assembly for operating at a third frequency ($f_3$) for direct communication with the other of said groups;

said communications centralizing unit further comprising a control assembly having a programmable processing means for managing the transfer of data from each of said data acquisition boxes by controlling operation of said first and second radio transmission and reception assemblies belonging to said centralizing unit; and said radio relay unit including a control assembly with a separate programmable processing means responsive to a signal from said centralizing unit second radio transmission and reception assembly operating at said second frequency ($f_1$) for managing the transfer of data to the central laboratory from the data acquisition box of said other of said groups as selected by the processing means of the centralizing unit, said transfer of data between said selected data acquisition box and said radio relay unit being at said third frequency and the transfer of the same data between said radio relay unit and said centralizing unit being at said second frequency;

including programmable frequency synthesis radio transmission means.

7. The system as claimed in claim 6, wherein said radio transmission means include a voltage controlled oscillator and a looped circuit including a frequency synthesizer with predivider applying to a reference frequency supplied by a quartz a division factor depending on the selection means.

8. In a system for transmission of seismic signals to a central control and recording laboratory from two groups of data acquisition boxes, each box being adapted for collecting signals from at least one seismic receiver and for digitizing and storing said signals as data;

one of said groups being in direct radio communication with said central laboratory without passing through a radio relay unit and the other of said groups being located where radio communication with the central laboratory is only through a path which includes at least one radio relay unit;

said central laboratory including a communications centralizing unit comprising a first radio transmission and reception assembly for operating at a first frequency ($f_2$) for direct communicatio with said one group and a second radio transmission and reception assembly for operation at a second frequency ($f_1$) for direct communication with said radio relay unit;

said radio relay unit having a first radio transmission and reception assembly for operating at said second frequency ($f_1$) for direct communication with said centralizing unit and a second radio transmission and reception assembly for operating at a third frequency ($f_3$) different from said first and second frequencies for direct communication with the other of said groups;

said communications centralizing unit further comprising a control assembly having a first programmable processing means for managing the transfer of data from each of said data acquisition boxes by controlling operation of said first and second radio transmission and reception assemblies belonging to said centralizing unit; and said radio relay unit including a control assembly with a second separate programmable processing means responsive to a signal from said centralizing unit second radio transmission and reception assembly operating at said second frequency ($f_1$) for managing the transfer of data to the central laboratory from the data acquisition box of said other of said groups as selected by the processing means of the centralizing unit, said transfer of data between said selected data acquisition box and said radio relay unit being at said third frequency determined by said second separate programmable processing means and the transfer of the same data between said radio relay unit and said centralizing unit being at said second frequency.

9. The system as claimed in claim 8, wherein said radio transmission and reception assembly associated with the boxes, with the centralization unit and with each relay unit includes a frequency synthesis generator and means for selecting from a plurality of separate frequencies a frequency with which reliable communication can be established at the time of each transmission.

10. A system for transmission of seismic signals between an assembly of acquisition boxes provided each with a radio transmission and reception means and a central control and recording laboratory, said acquisition boxes being disposed on the field and being adapted for collecting seismic signals from at least one seismic receiver for digitizing and storing said signals and, on reception of control signals from said central control and recording laboratory, for transferring thereto stored data by radio wave link, said assembly of acquisition boxes comprising:

a first group of acquisition boxes disposed on areas where direct communication with said central control and recording laboratory is possible; and at least one second group of acquisition boxes disposed on areas where reliable communication with said central control and recording laboratory can be achieved via at least one radio relay unit;

said system comprising:

a communication centralizing unit associated with said central and recording laboratory and including a first radio transmission and reception assembly operating at a first frequency ($f_2$) for direct communication between said laboratory and said first group of acquisition boxes and a second radio transmission and reception assembly operating at a second frequency ($f_1$) different from the first frequency for direct communication between said laboratory and each said radio relay unit;

each said radio relay unit including a first radio transmission and reception assembly for communication at said second frequency ($f_1$) with said communication centralizing unit, and a second radio transmission and reception assembly for communication at a particular third frequency ($f_3$) with acquisition boxes of said second group of acquisition boxes associated with said radio relay unit, the third frequency ($f_3$) being different for each said relay unit;

said communication centralizing unit including a control assembly provided with a programmable processing and memorizing means for routing orders from said central laboratory to each of the acquisition boxes of said assembly on said second frequency ($f_2$) or said first frequency ($f_1$) depending on their disposition on the field and for dispatching information from the different acquisition boxes;

each said relay unit including a control assembly provided with a programmable processing and memorizing means for managing relay transfers at said third specific frequency with said associated second group of acquisition boxes; and wherein also each radio relay unit includes test signal measurement means and means for translating the test signals into signals for modulating said second frequency $f_1$, the control assemblies of the centralization unit and of each relay unit being adapted for controlling the transmission of the test signals in time intervals between the data and control signal transmissions.

11. A system for transmission of seismic signals between an assembly of acquisition boxes provided each with a radio transmission and reception means and a central control and recording laboratory, said acquisition boxes being disposed on the field and being adapted for collecting seismic signals from at least one seismic receiver for digitizing and storing said signals and, on reception of control signals from said central control and recording laboratory, for transferring thereto stored data by radio wave link, said assembly of acquisition boxes comprising:

a first group of acquisition boxes disposed on areas where direct communication with said central control and recording laboratory occurs without passing through a radio relay unit; and at least one second group of acquisition boxes disposed on areas where reliable communication with said central control and recording laboratory can be achieved only via at least one radio relay unit; said system comprising:

a communication centralizing unit associated with said central and recording laboratory and including a first radio transmission and reception assembly operating at a first frequency ($f_2$) for direct communication between said laboratory and said first group of acquisition boxes and a second radio transmission and reception assembly operating at a second frequency ($f_1$) different from the first frequency for direct communication between said laboratory and each said radio relay unit;

each said radio rely unit includng a first radio transmission and reception assembly for communication at said second frequency ($f_1$) with said communication unit, and a second radio transmission and reception assembly for communication at a particular third frequency ($f_3$) with acquisition boxes of said second group of acquisition boxes associated with said ratio relay unit, the third frequency ($f_3$) being different for each said radio relay unit;

said communication centralizing unit including a control assembly for routing orders from said central laboratory to each of the acquisition boxes of said assembly on said second frequency ($f_2$) or said first frequency ($f_1$) depending on their disposition on the field and for dispatching information from the different acquisition boxes;

each said relay unit including a control assembly for managing relay transfers at said third specific frequency with said associated second group of acquisition boxes; and wherein said control assembly in said communication centralizing unit includes a microprocessor means, memorizing means for storing lists of serial numbers and acquisition boxes in said first group and lists of serial numbers of acquisition boxes in each said second group to be transmitted respectively to corresponding relay unit and programs of instructions, and interface means providing communication with said central control and recording laboratory and with a control member for direct application of instructions by an operator, said control assembly in each said relay unit includes a microprocessor means and memorizing means for storing lists of serial numbers of acquisition boxes in said corresponding second group, said lists being received from said control assembly; and each said radio transmission and reception assembly in said acquisition boxes of the assembly, in said centralizing unit and in each said relay unit includes a frequency synthesis generator and switchable selection means for selecting from a plurality of separate frequencies, a frequency with which reliable communication can be established with said centralizing unit.

* * * * *